Patented Oct. 31, 1950

2,527,794

UNITED STATES PATENT OFFICE 2,527,794

FLUOROBORIC ALKYLATION OF THIOPHENE

Philip D. Caesar, Wenonah, George C. Johnson, Woodbury, and John W. Brooks, Wenonah, N. J., assignors to Socony-Vacuum Oil Company, Incorporated, a corporation of New York No Drawing. Application June 1, 1946, Serial No. 673,900

10 Claims. (Cl. 260—329)

The present invention relates to the synthesis of homologues of thiophene and, more particularly, to a process for alkylating thiophene and alkylthiophenes in the presence of catalysts of the type dihydroxyfluoboric acid and the products of the reaction of water and boron trifluoride in which the amount of water is carefully controlled.

Alkylation reactions in general are well known in the art and are usually considered to be those reactions in which the union between alkyl radicals and molecules of alkylatable organic compounds occur under conditions of temperature, pressure and time usually referred to in the art as alkylating conditions. The compounds produced by the union between the alkyl radicals and the alkylatable organic compounds are called alkymers and represent, structurally, the addition of the original alkyl radical to the organic compound molecule. The total product of an alkylation reaction is referred to in the art as an alkylate which usually contains the alkymer, residual amounts of reactants and products produced by secondary reactions that occur concurrently with the principal or alkylation reaction.

Generally speaking, the temperature and, usually at least to a certain extent, the pressure and the time of reaction employed in alkylation operations depend upon whether the alkylation is effected in the absence or presence of alkylation catalysts. Alkylations carried out in the absence of a catalyst are generally referred to as thermal alkylation while those in which a catalyst is employed are known as catalytic alkylations.

In alkylation reactions, the alkyl radical is supplied by a compound known to the art as capable under reaction conditions of supplying an alkyl radical and, accordingly, such compounds are known as alkylating agents or alkylants. Compounds within this classification are olefinic hydrocarbons, alkyl halides, alcohols, aralkyl halides, organic and inorganic esters, ethers, alkyl sulfates, alkene oxides, thioethers and mercaptans.

It is well known to those familiar with the art that the synthesis of the homologues of thiophene has been effected mostly through the Fittig-Wurtz reaction which, as is generally known, involves condensing iodo-derivatives of thiophene with iodo- or bromo-alkyls in the presence of metallic sodium. However, the yields of thiophene homologues have always been small and the cost of the reagents have limited somewhat the commercial utilization of this synthesis. Furthermore, the reaction time varies for the production of different homologues. For example, the production of 2,3-thioxen (2,3-dimethylthiophene) from 2-iodo-3-methylthiophene (2-iodo-3 thiotolen) requires several days and the production of 2,5-thioxen (2,5-dimethylthiophene) from 5-iodo-2 thiotolen (5-iodo-2-methylthiophene) required an induction period of four weeks and then was completed in a few hours. The Friedel-Crafts synthesis has also been proposed for preparing thiophene homologues by the condensation of thiophene and halogen alkyls in the presence of aluminum chloride as a catalyst. Although this catalyst has been used with considerable success in the alkylation of aromatic hydrocarbons, its use has met with only moderate success where thiophene is concerned. This appears to be due to the relative instability of the thiophene ring.

The alkylation of thiophene has been an exceedingly difficult reaction to carry out with good yields of the desired product. The usual alkylation catalysts such as aluminum halides, and hydrogen fluoride cause excessive resinification of the thiophene. The resinification usually occurs before alkylation can be effected and, if the expected reaction product is formed, it is only formed in very small amounts.

It has now been discovered that homologues of thiophene can be produced employing a series of liquid catalysts containing boron and fluorine ranging from relatively pure dihydroxyfluoboric acid through dihydroxyfluoboric acid at least partially saturated with boron trifluoride and mixtures of dihydroxyfluoboric acid and hydrogen fluoride to aqueous solutions of boron trifluoride containing carefully controlled amounts of water equivalent to up to and including 6 moles of water per mole of boron trifluoride. This catalyst series may be defined as the boron-fluorine acids containing about 5 to about 17 per cent of boron, at least about 30 per cent and not more than about 80 per cent of fluorine, not more than about 53 per cent of oxygen and not more than about 7 per cent of hydrogen. However, it is preferred to use the group of catalysts within the foregoing class which has as its members those boron-fluorine acids containing about 10 to about 15 per cent of boron, at least about 45 per cent and not more than about 80 per cent of fluorine, not more than about 39 per cent of oxygen and less than about 4 per cent of hydrogen. In order that those skilled in the art may have a better understanding of the classification of the novel catalysts, a brief review of the methods of preparation and the products produced will be given.

Sowa and Nieuwland have described the synthesis of dihydroxyfluoboric acid in J. A. C. S. 57, 454 (1936) and U. S. Patent No. 2,109,340. According to these investigators, dihydroxyfluoboric acid ($H_3BO_2F_2$) may be prepared by reacting boron trifluoride and boric acid in accordance with the equation:

(A)  $BF_3 + 2H_3BO_3 \rightarrow H_3BO_2F_2 + 2HBO_2 + HF$ or from hydrogen fluoride and boric anhydride in accordance with the following equation:

(B)  $9H_2F_2 + 4B_2O_3 \rightarrow 6H_3BO_2F_2 + 2BF_3$

For the purposes of this invention the total reaction product of either reaction may be used or the dihydroxyfluoboric acid ($H_3BO_2F_2$) may be isolated in a relatively pure state by any suitable means, as for example, by distillation at reduced pressure. The alkylation of thiophene is also catalyzed by the reaction product obtained by saturating dihydroxyfluoboric acid with boron trifluoride to obtain a boron trifluoride complex of $H_3BO_2F_2$. This reaction may be represented by the following equation:

$$H_3BO_2F_2 + BF_3 \rightarrow H_3BO_2F_2 \cdot BF_3$$

The reaction product produced by saturating water at temperatures not greater than about 70 to 80 degrees Fahrenheit and represented by the equation:

$$BF_3 + H_2O \rightarrow BF_3 \cdot H_2O$$

(about 19 to about 21 per cent water by weight) also may be used as a catalyst in the formation of homologues of thiophene. Other aqueous solutions of boron trifluoride containing a controlled amount of water equivalent to 1 to 6 moles of water per mole of boron trifluoride likewise catalyze these reactions. A catalyst allied to these boron trifluoride hydrates (boron trifluoride containing 1 to 6 moles of water per mole of $BF_3$) is that obtained by adding boron trifluoride to a 42 per cent aqueous solution of fluoboric acid.

Other catalysts for the preparation of homologues by alkylation of thiophene and alkylthiophenes may be produced by reacting hydrogen fluoride and boric acid in the proportion of 6 moles of hydrogen fluoride to 2 moles of boric acid and by reacting boron trifluoride, water and boric acid in the proportions of boron trifluoride 4 moles, boric acid 1 mole, and water 3 moles.

In U. S. Patent No. 2,348,637 Meinert has shown that the saturation of water with $BF_3$ probably produces fluoboric acid and certain hydrates of boron trifluoride. However, the composition of the reaction product is only speculative. In view of the foregoing, the novel catalysts are tabulated hereinafter and discussed in conjunction with that tabulation:

CATALYST

A. $BF_3 + 2H_3BO_3 \rightarrow H_3BO_2F_2 + 2HBO_2 + HF$
B. $9H_2F_2 + 4B_2O_3 \rightarrow 6H_3BO_2F_2 + 2BF_3$
C. $H_3BO_2F_2 + BF_3 \xrightarrow{distillation} H_3BO_2F_2$ (isolated)
D. $BF_3 + H_3BO_2F_2 \rightarrow H_3BO_2F_2 \cdot BF_3$
E. $BF_3 + H_2O \xrightarrow{saturation} BF_3 \cdot H_2O$ (19–21% $H_2O$ by weight) ($H_2O$ to $BF_3$ mole ratio not exceeding 1.5 to 1.0)
F. $43g. BF_3 \cdot H_2O + 27g. H_2O \rightarrow BF_3 \cdot 4H_2O$
G. $28.6g. BF_3H_2O + 30g. H_2O \rightarrow BF_3 \cdot 6H_2O$
H. $6HF + 2H_3BO_3$
J. $BF_3 + 42\%$ aqueous $HBF_4$
K. Commercial 42% aqueous $HBF_4$
L. $4BF_3 + H_3BO_3 + 3H_2O$
M. $H_3BO_2F_2 + HF$ The theoretical compositions of these catalysts are given in the following tabulation:

| Catalyst | Boron | Fluorine | Hydrogen | Oxygen |
|---|---|---|---|---|
| A | 16.9 | 29.8 | 3.1 | 50.2 |
| B | 13.5 | 53.6 | 2.8 | 30.1 |
| C | 12.9 | 45.3 | 3.6 | 38.2 |
| D | 14.2 | 62.7 | 2.0 | 21.1 |
| E | 13.5 | 70.5 | 1.8 | 14.2 |
| F | 8.3 | 43.4 | 5.4 | 42.9 |
| G | 6.5 | 34.4 | 6.5 | 52.6 |
| H | 8.9 | 46.8 | 4.9 | 39.4 |
| J | 11.9 | 66.1 | 2.6 | 19.4 |
| K | 5.2 | 36.4 | 6.9 | 51.5 |
| L | 13.8 | 56.7 | 2.5 | 27.0 |
| M | 10.4 | 54.9 | 3.9 | 30.8 |

The foregoing catalysts can be divided into at least three groups on the basis of their accelerating effect upon the alkylation of thiophene. However, the preferred catalysts are catalysts B, C, D, E, J, L and M. Catalysts B, J, L, E and D are the most effective, catalysts C, M and H are slightly less effective, and catalysts A, K, F and G still less effective. For example, thiophene can be alkylated using as an alkylating agent the active olefins isobutylene, di-isobutylene and octene-1 and the catalyst B. However, it is to be noted that under the same conditions with which thiophene was alkylated with isobutylene using catalyst B there was no reaction between benzene and isobutylene. It will be observed that catalyst B contains about 54% fluorine and that the weaker catalysts, i. e., A, G, K, F, C and H all contain less than 54% fluorine. Accordingly, the preferred catalysts consist essentially of boron fluorine acids containing not more than 54% fluorine, up to 17% boron and at least 2.8% hydrogen and having a fluorine to oxygen ratio of about 0.65 to about 1.78 to 1. Within the foregoing class of catalysts is a smaller group consisting essentially of boron-fluorine acids containing about 34 to 44% fluorine, about 5 to about 8% boron, about 5 to about 7% hydrogen and having a fluorine to oxygen ratio of about 0.65 to about 1 to 1. Especially preferred is a catalyst consisting essentially of a boron-fluorine acid containing about 45.3% fluorine, about 12.9 boron, about 3.6% hydrogen and about 38.2% oxygen.

Catalyst D catalyzes the alkylation of thiophene using octene-1 and propylene as the alkylating agent. Catalyst C is effective in the alkylation of thiophene with octene-1 and propylene as the alkylating agents. Catalyst E is effective in the alkylation of thiophene with octene-1 and hexadecene-1. Catalysts F and G catalyze the alkylation of thiophene with isobutylene. Thiophene is alkylated with pentene-1, octene-1 and isobutylene in the presence of catalysts H and J. Catalysts K and L can be used in the alkylation of thiophene using isobutylene as the alkylating agent. Thus, it is apparent from the foregoing that the novel catalysts vary widely in their activity for this alkylation. For example, catalyst E catalyzes the alkylation of thiophene with olefins ranging from propylene to normal olefins of 16 carbon atoms or more, say 26 carbon atoms; whereas catalyst G can be used only with such active olefins as isobutylene and isoamylene. On the other hand, catalyst B can be used to catalyze the alkylation of thiophene using alkyl halides and alcohols as the alkylating agents. On the basis of the foregoing and other experimental data, the catalysts enumerated hereinbefore can be rated with respect to effectiveness as indicated in the following table:

| Catalyst Designation | Per Cent F | Fluorine Oxygen Ratio | Per Cent O | Per Cent B | Per Cent H | Rating of Catalyst Effectiveness |
|---|---|---|---|---|---|---|
| G | 34.4 | .654:1 | 52.6 | 6.5 | 6.5 | + |
| K | 36.4 | .707:1 | 51.5 | 5.2 | 6.9 | + |
| A | 29.8 | .593:1 | 50.2 | 16.9 | 3.1 | + |
| F | 43.4 | 1.04:1 | 42.9 | 8.3 | 5.4 | + |
| C | 45.3 | 1.19:1 | 38.2 | 12.9 | 3.6 | ++ |
| H | 46.8 | 1.19:1 | 39.4 | 8.9 | 4.9 | ++ |
| M | 54.9 | 1.78:1 | 30.8 | 10.4 | 3.9 | ++ |
| B | 53.6 | 1.78:1 | 30.1 | 13.5 | 2.8 | +++ |
| L | 56.7 | 2.1:1 | 27.0 | 13.8 | 2.5 | +++ |
| D | 62.7 | 2.97:1 | 21.1 | 14.2 | 2.0 | +++ |
| J | 66.1 | 3.41:1 | 19.4 | 11.9 | 2.6 | +++ |
| E | 70.5 | 4.96:1 | 14.2 | 13.5 | 1.8 | +++ |

+++ Most effective.
++ Slightly less effective.
+ Still less effective.

It will be noted that the most effective catalysts are those having fluorine concentration in excess of 50 per cent and a fluorine to oxygen ratio of at least about 1.8:1. These catalysts may be used with substantially all alkylating agents; i. e., active olfins such as isobutylene and isoamylene as well as the relatively inactive normal olefins of three to 26 carbon atoms. These catalysts may also be used in alkylating alkylatable thiophene when using such alkylating agents as alkyl halides and alcohols. Catalysts containing in excess of about 45 per cent fluorine and having a fluorine to oxygen ratio of about 1.2 to about 1.8:1 are not effective with such olefins as the normal olefins having three to 26 carbon atoms in the molecule or other alkylating agents such as the alkyl halides and alcohols, but are effective with active olefins such as isobutylene and normal olefins of five to eight carbon atoms. Catalysts containing between about 34 and about 44 per cent fluorine and having a fluorine to oxygen ratio of about 0.65 to about 1.0:1 are effective catalysts for the alkylation of alkylatable thiophenes when using such active alkylating agents as isobutylene and isoamylene.

Accordingly, it is an object of the present invention to provide a means of producing homologues of thiophene by alkylation of thiophene with alkylating agents under alkylating conditions in the presence of alkylating catalysts defined as compounds of boron and fluorine containing about 5 to about 17 per cent of boron, at least about 30 per cent and not more than about 80 per cent of fluorine, not more than about 53 per cent of oxygen and not more than about 7 per cent of hydrogen. It is another object of the present invention to provide a method for the production of homologues of thiophene by the alkylation of thiophene with olefins in the presence of catalysts containing about 10 to about 15 per cent of boron, at least about 45 per cent and not more than about 80 per cent of fluorine, not more than about 39 per cent of oxygen and less than about 4 per cent of hydrogen. It is a further object of the present invention to provide a method for catalytically alkylating thiophene with alkylating agents under alkylating conditions of temperature, pressure and reaction time in the presence of dihydroxyfluoboric acid. Other objects and advantages will become apparent from the following description.

In general, the formation of homologues of thiophene by alkylation using known alkylating agents and the catalysts defined herein takes place under alkylating conditions of temperature, pressure and reaction time. The temperature may be from about 10 to about 200 degrees centigrade at autogenous or higher pressures. Although, in general, temperatures within the range of about 10 to about 20 degrees centigrade may be used, the selection of the reaction temperature to provide most desirable results is dependent to some degree upon the activity of the catalyst and the activity of the alkylating agent. Thus, when using a highly reactive alkylating agent and a catalyst of the first group (catalysts B, C, D, E, J, L and M), temperatures in the lower part of the range are preferred. On the other hand, when using a less active catalyst (catalysts A, F, G, H and K) temperatures in the upper portion of the range may be used. The time of reaction may be from about 15 minutes to about 3 hours or longer, dependent upon the alkylating agent and the particular catalyst. Illustrative of the foregoing are the following non-limiting examples.

EXAMPLE I

*Catalyst preparation (B)*

Boric anhydride, about 696 parts by weight (about 10 moles), about 1,000 parts by weight of petroleum ether were placed in an autoclave and about 900 parts by weight hydrogen fluoride (about 45 moles) were added at about 20 degrees centigrade. The reaction mixture was stirred under autogenous pressure for about 30 minutes and about 1640 parts by weight of catalyst recovered. This catalyst is designated catalyst B.

*Alkylation*

During the course of about one hour about 25 parts by weight of isobutylene (about 0.45 mole) were added to about 42 parts by weight of thiophene (about 0.5 mole) and about 0.025 part by weight (based on the weight of the reactants) of catalyst B. The reaction mixture was stirred and maintained at about 40 to about 45 degrees centigrade during the addition of the alkylating agent. Sixty-seven parts by weight of product were recovered. The product was separated from the catalyst, water-washed and distilled in a modified Vigreaux flask. The following cuts were taken:

| Product | Boiling Range °C. | Parts by Weight | Sp. Gr. |
|---|---|---|---|
| Thiophene | 70–140 | 12 | |
| t-butylthiophene | 150–210 | 35 | 0.950 |
| di-t-butylthiophene | above 210 | 11 | 0.920 |

EXAMPLE II

To about 50 parts by weight of catalyst B about 41 parts by weight of thiophene (about 0.5 mole)

and about 84 parts by weight of tri-isobutylene (about 0.5 mole) were added. The reaction mixture was heated with stirring to about 80 degrees centigrade for about one hour. Thereafter the product was separated from the catalyst and water-washed. The water-washed product was distilled and the following cuts taken:

| Product | Boiling Range | Parts by Weight |
|---|---|---|
| | °C. | |
| Thiophene and Butylene Polymers | 45–200 | 10 |
| di-t-butylthiophene and residue | above 200 | 74 |

EXAMPLE III

Catalyst preparation (C)

The catalyst B comprising a mixture of dihydroxyfluoboric acid and boron trifluoride was distilled. The distillate was essentially pure dihydroxyfluoboric acid (catalyst C).

Alkylation

In the course of about one hour about 27 parts by weight of isobutylene (about 0.48 mole) were added to about 42 parts by weight of thiophene (about 0.5 mole) and about 0.025 part by weight of the above catalyst C. During the addition of the alkylating agent the mixture was stirred and maintained at about 40 to about 45 degrees centigrade. The product was separated from the catalyst, water-washed and distilled in a modified Vigreaux flask. The following cuts were taken:

| Product | Boiling Range | Parts by Weight | Sp. Gr. |
|---|---|---|---|
| | °C. | | |
| Thiophene | 70–140 | 21 | |
| t-butylthiophene | 145–185 | 25 | 0.954 |
| di-t-butylthiophene | above 185 | 18 | 0.919 |

EXAMPLE IV

To 168 parts by weight of thiophene (2 moles) and about 40 parts by weight of distilled dihydroxyfluoboric acid (0.48 mole) (catalyst C) were added during about 30 minutes about 90 parts by weight of isobutylene (1.6 moles) while the mixture was stirred in an autoclave at about 30 degrees centigrade. The reaction mixture was stirred for about another thirty minutes and 244 parts by weight of the product (Sp. Gr. (60° F.) =0.9646) were separated from the catalyst, water-washed, dried over calcium chloride and distilled in an A. S. T. M. distillation apparatus.

| Product | Boiling Range | Volume Per Cent |
|---|---|---|
| | °C. | |
| Thiophene and Butylene Polymers | 70–140 | 40 |
| t-butylthiophene | 140–180 | 40 |
| di-t-butylthiophene | 180–250 | 20 |

EXAMPLE V

Catalyst preparation (D)

The catalyst D was prepared by adding boron trifluoride to about 100 parts by weight (1.2 moles) of dihydroxyfluoboric acid in a bomb until the pressure remained constant at 10 pounds per square inch; then the excess boron trifluoride was vented.

Alkylation

About one mole of thiophene (about 84 parts by weight) about one mole (about 112 parts by weight) of octene-1 and about 80 parts by weight of catalyst D prepared as described hereinbefore were stirred in an autoclave for about 2 hours at about 70 degrees centigrade. The product was separated from the catalyst, water-washed and distilled in a modified Vigreaux flask. The following cuts were taken:

| Product | Boiling Range | Parts by Weight |
|---|---|---|
| | °C. | |
| Thiophene and Octene-1 | 80–160 | 90 |
| Intermediate | 160–210 | 2 |
| Octylthiophene | 210–244 | 23 |
| Residue | above 244 | 9 |

EXAMPLE VI

About one mole of thiophene (about 84 parts by weight), about 42 parts by weight of propylene and about 80 parts by weight of catalyst D were stirred for about 2 hours at about 100 degrees centigrade. The product was separated from the catalyst, water-washed and distilled in a modified Vigreaux flask. The following cuts were taken:

| Product | Boiling Range | Sp. Gr. | Parts by Weight |
|---|---|---|---|
| | °C. | | |
| Thiophene | 80–110 | | 44 |
| Propylthiophene | 110–160 | 0.952 | 8 |
| di-propylthiophene | 160–210 | | 5 |
| Residue | above 210 | | 15 |

EXAMPLE VII

Preparation of catalyst (E)

Catalyst E was prepared by adding boron trifluoride to about 30 parts by weight of water in a pressure-resistant container until the pressure remained constant at about 10 pounds per square inch gauge. The excess boron trifluoride was vented and about 188 parts by weight of catalyst recovered having water to boron trifluoride mole ratio not exceeding about 1.5 to about 1.0.

Alkylation

About one mole (about 84 parts by weight) of thiophene, about one mole (about 112 parts by weight) octene-1 and about 80 parts by weight of catalyst E were stirred at about 75 degrees centigrade for about 2 hours. The product was separated from the catalyst, water-washed and distilled in a modified Vigreaux flask. Three fractions were obtained:

| Product | Boiling Range | Sp. Gr. | Parts by Weight |
|---|---|---|---|
| | °C. | | |
| Thiophene and Octene-1 | 89–200 | | 7 |
| Octylthiophene | 200–240 | 0.916 | 43 |
| di-octylthiophene and Residue | above 240 | 0.937 | 87 |

EXAMPLE VIII

About one mole (about 84 parts by weight) of thiophene and about one mole (about 224 parts by weight) of hexadecene-1 were stirred in a pressure resisting container at about 75 degrees centigrade for about 2 hours. During the first 30 minutes or so about 80 parts by weight of catalyst E were added. The product was separated from the catalyst, water-washed and distilled under vacuum.

| Product | Boiling Range | Sp. Gr. | Parts by Weight |
|---|---|---|---|
| | °C. | | |
| Hexadecene-1 | 100–130 | | 75 |
| Hexadecylthiophene | 145–175 | 0.8927 | 25 |
| Residue | above 175 | 0.8702 | 18 |

EXAMPLE IX

Preparation of catalyst (F)

Catalyst F was prepared by adding about 43 parts by weight of catalyst E to about 27 parts by weight of water.

Alkylation

One mole (about 84 parts by weight) of thiophene, one mole (about 56 parts by weight) of isobutylene and about 80 parts by weight of catalyst F were stirred for about 2 hours at about 65 degrees centigrade. The reaction product was separated from the catalyst, water-washed and distilled in a modified Vigreaux flask. The following fractions were recovered:

| Product | Boiling Range | Sp. Gr. | Parts by Weight |
|---|---|---|---|
| | °C. | | |
| Thiophene and Olefin Polymer | 80–130 | 0.928 | 33 |
| t-butylthiophene | 130–190 | 0.921 | 42 |
| di-t-butylthiophene | 190–226 | 0.917 | 22 |

EXAMPLE X

Preparation of catalyst (G)

Catalyst G was prepared by adding about 28.6 parts by weight of catalyst E to about 30 parts by weight of water.

Alkylation

One mole (about 85 parts by weight) of thiophene, one mole (about 56 parts by weight) of isobutylene and about 80 parts by weight of catalyst G were stirred for about 2 hours at about 72 degrees centigrade.

The reaction product was separated from the catalyst, water-washed and distilled in a modified Vigreaux flask. The following distillates were recovered:

| Product | Boiling Range | Sp. Gr. | Parts by Weight |
|---|---|---|---|
| | °C. | | |
| Thiophene | 80–160 | 0.968 | 30 |
| t-butylthiophene | 160–175 | 0.911 | 7 |
| Butylene Polymers | 175–190 | | 6 |
| Residue | above 190 | | 1 |

EXAMPLE XI

Preparation of catalyst (H)

Catalyst H was prepared by adding about 6 moles (about 120 parts by weight) of hydrogen fluoride to about 2 moles (about 124 parts by weight) of boric acid and an equal volume (about 130 parts by weight) of petroleum ether (boiling range 30 to 60° C.) and stirred at about 20 degrees centigrade for about 30 minutes.

Alkylation

One mole (about 84 parts by weight) of thiophene, about 0.86 mole (about 60 parts by weight) of pentene-1 and about 80 parts by weight of catalyst H were stirred for about 3 hours at about 100 degrees centigrade in an autoclave at autogenous pressure. The reaction product was separated from the catalyst, water-washed and distilled in a modified Vigreaux flask to obtain three fractions.

| Product | Boiling Range | Sp. Gr. | Parts by Weight |
|---|---|---|---|
| | °C. | | |
| Thiophene and Pentene-1 | 40–140 | | 63 |
| Amylthiophene | 140–195 | 0.942 | 21 |
| Residue | above 195 | | 5 |

EXAMPLE XII

About one mole (about 84 parts by weight) of thiophene, about one mole (about 56 parts by weight) of isobutylene and about 80 parts by weight of catalyst H were stirred in a pressure resistant container for about 3 hours at about 100 degrees centigrade at autogenous pressure. The reaction product and catalyst were separated, the reaction product water-washed, the washed product distilled in a modified Vigreaux flask and three fractions obtained:

| Product | Boiling Range | Sp. Gr. | Parts by Weight |
|---|---|---|---|
| | °C. | | |
| Thiophene | 80–130 | | 50 |
| t-butylthiophene and Butylene Polymer | 130–180 | 0.889 | 44 |
| di-t-butylthiophene | 180–220 | 0.913 | 8 |

EXAMPLE XIII

Preparation of catalyst (J)

Catalyst J was prepared by adding boron trifluoride to about 30 parts by weight of aqueous fluoboric acid (42 per cent) in a pressure resistant container until the pressure remained substantially constant at about 10 pounds per square inch. The excess boron trifluoride ($BF_3$) was vented.

Alkylation

About one mole (about 84 parts by weight) of thiophene, about 1 mole (about 112 parts by weight) of octene-1 and about 80 parts by weight of catalyst J were stirred for about 2 hours at 76 degrees centigrade. The product and catalyst were separated and the product washed with water. The water-washed product was fractionated in a modified Vigreaux flask into two fractions.

| Product | Boiling Range | Sp. Gr. | Parts by Weight |
|---|---|---|---|
| | °C. | | |
| Thiophene and Octene-1 | 70–140 | 0.790 | 118 |
| Octylthiophene | 200–248 | 0.911 | 31 |

EXAMPLE XIV

About 56 parts by weight (one mole) of isobutylene were added to about 42 parts by weight (0.5 mole) of thiophene and about 10 parts by weight of 42 per cent commercial aqueous fluoboric acid (catalyst K). The mixture was stirred for about 2 hours at about 95 degree centigrade. The product was separated from the catalyst, washed with water and distilled.

| Product | Boiling Range | Sp. Gr. | Parts by Weight |
|---|---|---|---|
| | °C. | | |
| Thiophene | 70–90 | | 19 |
| Butylene Polymer | 90–160 | | 20 |
| t-butylthiophene | 160–170 | 0.922 | 19 |
| Residue | above 170 | | 9 |

EXAMPLE XV

Preparation of catalyst (L)

Boron trifluoride was added to an aqueous solution of about 15.5 parts by weight of $HBO_3$ (about 0.25 mole) and about 13.5 parts by weight (about 0.75 mole) of water in a pressure resistant container to saturation, i. e., until the pressure became constant at 10 pounds per square inch. The excess boron trifluoride was vented. The constituents of catalyst L therefore had been reacted in the mole proportion $BF_3:HBO_3:H_2O$ of 4:1:3.

Alkylation

About 84 parts by weight (about 1 mole) of thiophene, about 56 parts by weight (about 1 mole) of isobutylene and about 80 parts by weight of catalyst L were stirred in a pressure resistant container at autogenous pressure at about 75 degrees centigrade for about 2 hours. The reaction mixture was separated from the catalyst, washed with water and distilled in a modified Vigreau flask. Three fractions were recovered.

| Product | Boiling Range | Sp. Gr. | Parts by Weight |
|---|---|---|---|
| | °C. | | |
| Thiophene | 60–140 | 1.0 | 17 |
| t-butylthiophene | 140–180 | 0.934 | 22 |
| di-t-butylthiophene | 180–250 | 0.9153 | 18 |
| Residue | above 250 | | 8 |

EXAMPLE XVI

About 42 parts by weight (about 0.5 mole) thiophene, about 45 parts by weight (about 0.49 mole) of t-butylchloride and about 16 parts by weight of undistilled catalyst B ($H_3BO_2F_2+BF_3$) were stirred at about 60 degrees centigrade for about one half hour. (Hydrogen chloride was evolved.) The reaction product was separated from the catalyst and water-washed. The water-washed product was fractionated in a modified Vigreaux flask into three distillates.

| Product | Boiling Range | Sp. Gr. | Parts by Weight |
|---|---|---|---|
| | °C. | | |
| Thiophene | 70–140 | | 14 |
| t-butylthiophene | 140–180 | 0.940 | 25 |
| Residue | above 180 | | 8 |

EXAMPLE XVII

About 42 parts by weight (about 0.5 mole) of thiophene and about 45 parts by weight (about 0.61 mole) t-butyl alcohol were added slowly at 65 degrees centigrade to about 16 parts by weight of undistilled catalyst B ($H_3BO_2F_2+BF_3$). The reaction was allowed to proceed for about two hours. The reaction product was separated from the catalyst and washed with water. The water-washed product was distilled in a modified Vigreaux flask into two fractions.

| Product | Boiling Range | Sp. Gr. | Parts by Weight |
|---|---|---|---|
| | °C. | | |
| Thiophene and t-butyl alcohol | 50–130 | | 91 |
| t-butylthiophene | 130–170 | 0.911 | 3 |

Although the present invention has been illustrated by numerous examples, those skilled in the art will realize that the variables time of reaction, pressure of reaction and temperature of reaction can be varied. However, in general, as the temperature of the reaction is increased the reaction pressure increases and the time of reaction decreases. On the other hand, somewhat greater yields of desirable products can be obtained when weak catalysts and relatively inactive alkylating agents are employed by increasing the reaction temperature without materially reducing the reaction time.

Furthermore, while the novel process has been illustrated hereinbefore generally by examples of the treatment of thiophene, the present process may be used for the alkylation of thiophene derivatives having at least one replaceable nuclear hydrogen atom. In addition, it is to be understood that olefins having 3 to 26 carbon atoms are the preferred alkylating agents although olefins having 2 carbon atoms may also be used.

We claim:

1. A method of alkylating thiophene and thiophene derivatives having replaceable nuclear hydrogen which comprises reacting a thiophene from the class consisting of thiophene and thiophene derivatives having a replaceable hydrogen attached to the thiophene nucleus with alkylating agents under alkylating conditions in the presence of a catalyst consisting of dihydroxyfluoboric acid.

2. A method of alkylating thiophene and thiophene derivatives having a replaceable nuclear hydrogen which comprises reacting a thiophene from the class consisting of thiophene and thiophene derivatives having a replaceable hydrogen attached to the thiophene nucleus with alkylating agents under alkylating conditions in the presence of dihydroxyfluoboric acid at least partially saturated with boron trifluoride.

3. A method of alkylating thiophene and thiophene derivatives having a replaceable nuclear hydrogen which comprises reacting a thiophene from the class consisting of thiophene and thiophene derivatives having a replaceable hydrogen attached to the thiophene nucleus with alkylating agents under alkylating conditions in the presence of dihydroxyfluoboric acid at least partially saturated with hydrogen fluoride.

4. A method of alkylating thiophene and thiophene derivatives having a replaceable nuclear hydrogen which comprises reacting a thiophene from the class consisting of thiophene and thiophene derivatives having replaceable hydrogen attached to the thiophene nucleus with olefins having 3 to 26 carbon atoms under alkylating conditions in the presence of a catalyst consisting of dihydroxyfluoboric acid.

5. A method of alkylating thiophene and thiophene derivatives having a replaceable nuclear hydrogen which comprises reacting a thiophene from the class consisting of thiophene and thiophene derivatives having a replaceable hydrogen attached to the thiophene nucleus with olefins having 3 to 26 carbon atoms under alkylating conditions in the presence of dihydroxyfluoboric acid at least partially saturated with boron trifluoride.

6. A method of alkylating thiophene and thiophene derivatives having a replaceable nuclear hydrogen which comprises reacting a thiophene from the class consisting of thiophene and thiophene derivatives having a replaceable hydrogen attached to the thiophene nucleus with mercaptans under alkylating conditions in the presence of dihydroxyfluoboric acid at least partially saturated with boron trifluoride.

7. The method of alkylating alkylatable thiophene which comprises forming a reaction mass containing an alkylatable thiophene having at least one replaceable hydrogen atom attached to the thiophene nucleus, an alkylating agent and a catalyst consisting essentially of boron-fluorine acids containing not more than 54% fluorine, up to 17% boron and at least 2.8% hydrogen and having a fluorine to oxygen ratio of about 0.65 to about 1.78 to 1, and holding said reaction mass at about 10° to about 200° C. for about 0.25 hour to about 3 hours, the lower the fluorine to oxygen ratio the higher the reaction temperature and the longer the reaction time.

8. The method of alkylating alkylatable thiophene which comprises forming a reaction mixture containing an alkylatable thiophene having a replaceable hydrogen atom attached to the thiophene nucleus, an alkylating agent selected from the group consisting of iso-olefins having 3 to 26 carbon atoms in the molecule and normal olefins having 5 to 8 carbon atoms in the molecule, and a catalyst consisting essentially of boron-fluorine acids containing about 34 to 44% fluorine, about 5 to about 8% boron, about 5 to about 7% hydrogen and having a fluorine to oxygen ratio of about 0.65 to about 1 to 1, and holding said reaction mass at about 65° to about 200° C. for about 2 to about 3 hours, the lower the fluorine to oxygen ratio the higher the reaction temperature and the longer the reaction time.

9. The method of alkylating thiophene which comprises forming a reaction mass containing an alkylatable thiophene having at least one replaceable hydrogen atom attached to the thiophene nucleus, an alkylating agent and a catalyst consisting essentially of a boron-fluorine acid containing about 45.3% fluorine, about 12.9% boron, about 3.6% hydrogen and about 38.2% oxygen, and holding said reaction mass at about 10° to about 200° C. for about 0.25 to about 3 hours.

10. The method of alkylating alkylatable thiophene which comprises forming a reaction mass containing an alkylatable thiophene having at least one replaceable hydrogen attached to the thiophene nucleus, an alkylating agent and a catalyst consisting essentially of boron-fluorine acids containing about 29 to about 47% fluorine, about 38 to about 72% oxygen, about 5 to about 17% boron, about 3 to about 7% hydrogen and having a fluorine to oxygen ratio of about 0.51 to about 1.2:1, and holding said reaction mass at about 65° to about 200° C. for about 2 to about 3 hours, the lower the fluorine to oxygen ratio the higher the reaction temperature and the longer the reaction time.

PHILIP D. CAESAR.
GEORGE C. JOHNSON.
JOHN W. BROOKS.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,376,119 | Bruner | May 15, 1945 |
| 2,396,144 | Anderson | Mar. 5, 1946 |
| 2,429,575 | Appleby | Oct. 21, 1947 |
| 2,432,482 | Matuszak | Dec. 9, 1947 |

OTHER REFERENCES

Richter, Organic Chemistry, pp. 649–650, Wiley, N. Y., 1938.

Bernthsen and Sudborough, Organic Chemistry, page 549, Van Nostrand, N. Y., 1922 edition.

Caesar and Sachanen, Ind. Eng. Chem. 40, 922, (1948).